Dec. 15, 1964  E. S. MESSER  3,161,355
INTEGRATOR AND COUNTER MEANS THEREFOR
Filed April 7, 1961  3 Sheets-Sheet 1

INVENTOR.
Elmer S. Messer
BY
Ooms, McDougall, Williams & Hersh
Att'ys

Dec. 15, 1964  E. S. MESSER  3,161,355
INTEGRATOR AND COUNTER MEANS THEREFOR
Filed April 7, 1961  3 Sheets-Sheet 2

INVENTOR.
Elmer S. Messer
BY
Ooms, McDougall, Williams & Hersh
Att'ys

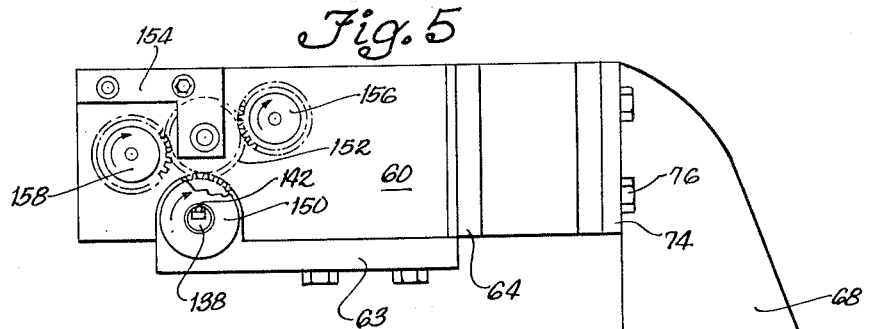
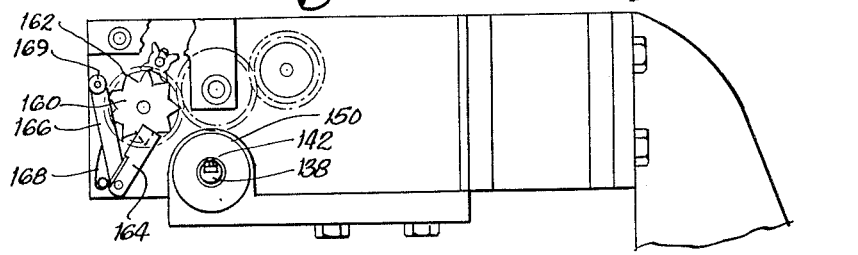
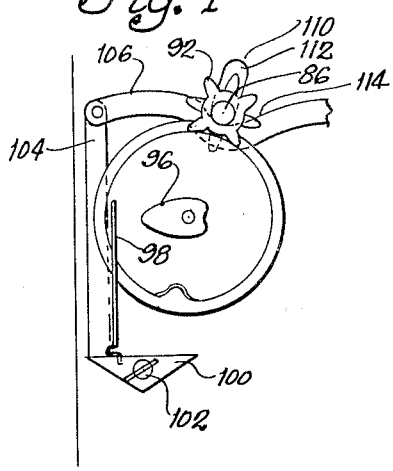
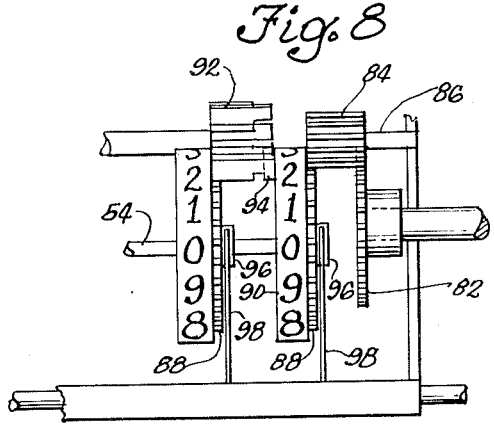
INVENTOR.
Elmer S. Messer

United States Patent Office 3,161,355
Patented Dec. 15, 1964

3,161,355
INTEGRATOR AND COUNTER MEANS THEREFOR
Elmer S. Messer, Tulsa, Okla., assignor to Flow
Measurement Company, Inc., Tulsa, Okla.
Filed Apr. 7, 1961, Ser. No. 101,409
10 Claims. (Cl. 235—61)

This invention relates to an instrument for use in integrating the curves or orifice type meter charts prepared in the measurement of the flow of fluids and it relates more particularly to a new and improved counter mechanism for an integrator of the type described.

In the measurement of the flow of fluids through conduits or pipe, as in the flow of gas from a well or through a pipe line, it is common practice to provide the pipe with an orifice plate having an opening therein which provides for a pressure differential on opposite sides of the plate during fluid flow. Use is also made of an orifice meter in operative connection with the orifice plate to record both the static pressure and the differential in pressure on the opposite sides of the orifice plate. Record is kept by graphic line drawings on a circular or disc chart which is driven at constant speed for charting over a specific period of time, such as a twenty-four hour period.

In accordance with the known laws of fluid flow, the average rate of flow of the fluid is equal to a constant times the square root of the product of the absolute average static pressure and the average differential pressure across the orifice. The constant that enters into the described computation depends on the type of fluid, the temperature of the fluid, the design of the particular orifice meter, and other factors which are taken into consideration in arriving at the used value. Thus it becomes possible by reading the charts or integrating the curves graphically displayed thereon to calculate the amount of fluid delivered through the particular pipe or passage.

Originally such gas orifice meter charts were read by hand for calculating the volume of gas passed through the orifice plate into the pipe line or the like. In order to obviate the large amount of time and effort consumed in integrating such charts, an integrating machine was developed which machine and modifications thereof are more fully described in the issued patent of McGaughy No. 2,057,664; the McGay Patent No. 2,128,834, and the McGay et al. Patent No. 2,773,642. Such integrating machines, which are rather complicated in construction and operation, will hereinafter briefly be described with reference to the improvement embodying the features of this invention. Suffice it to say that the values which are secured by integration of the charts are recorded on a counter which moves with the counter wheel over the rotating counter disc as followers for the pens of the integrator are shifted over the static and differential lines of the graphic chart during its rotational movement. Such continuous movement of the counter during operation of the machine imposes excessive loading onto the unit which loading is believed to be responsible, at least in part, for excessive wear and for errors in calculation.

Another objectionable characteristic of counter systems which have been employed to date resides in the necessity to record the values appearing in the counter at the start for subtracting from the value after thet chart has been integrated to obtain a value to be used in the equation by which the volume of gas can be determined, especially if a totalized value is desired for a large number of charts as a check.

The invention which forms the subject matter of this application is addressed to and it is an object of this invention to provide an improvement in a counter mechanism and its combination with the integrating machine wherein the counter is capable of being stationarily supported on a suitable sturdy base to minimize error in operation; wherein a continuous transfer of values can be achieved without error in transmission or location of the counter wheel; wherein excessive loading on the wheel is minimized; and wherein the value read on the counter expresses the total to be used in the calculation without the necessity of recording the original value for subtraction from a final reading, yet wherein the total of a large number of charts can be read directly from the counter; and wherein indexing means are employed properly to position the elements of the counter before and after chart integration.

It is an object of this invention to produce an integrator of the type described having new and improved counter means forming a part thereof and it is a related object to produce a counter of the type described which is simple in construction, easy in operation and flexible in use, thereby to provide a more reliable reading of the chart for use in calculation of the gas flow volume.

These and other objects and advantages of this invention will hereinafter appear and for purposes of illustration, but not of limitation, an embodiment of the invention is shown in the accompanying drawings, in which—

FIG. 5 is an end view in elevation of the counter assembly shown in FIGS. 3 and 4 but with the indexing means omitted;

FIG. 6 is an end elevational view similar to that of FIG. 5 with the counter indexing means;

FIG. 7 is a sectional view across the counter showing part of the counter wheel indexing means, and FIG. 8 is a front elevational view of the counter showing the tens transfer and indexing arrangement.

Figure 1:
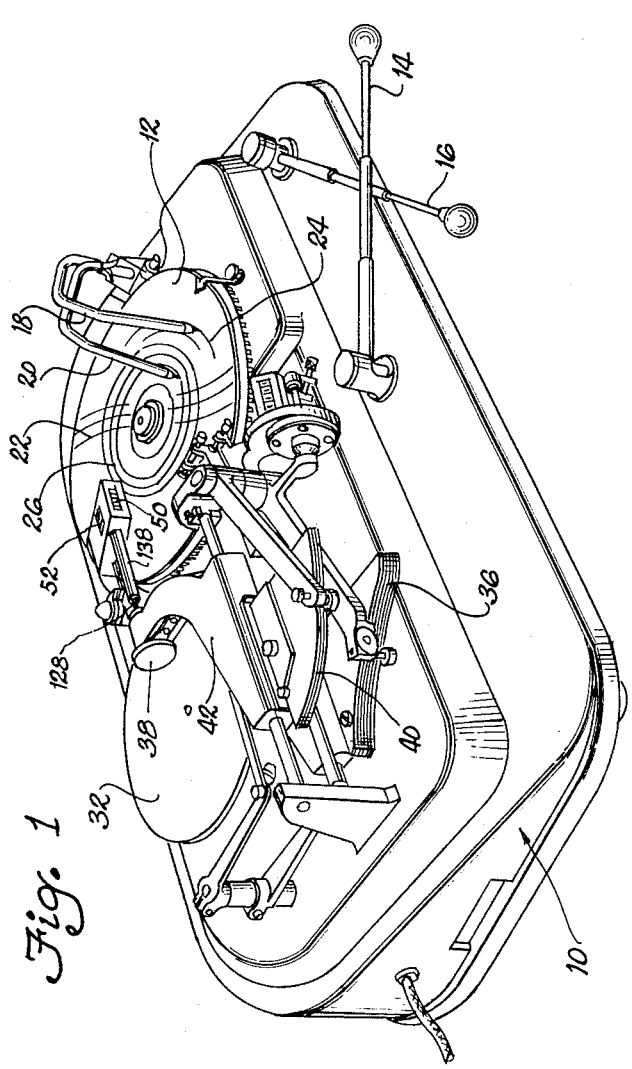
FIG. 1 is a perspective view of an integrator machine embodying the features of this invention.
Figure 2:
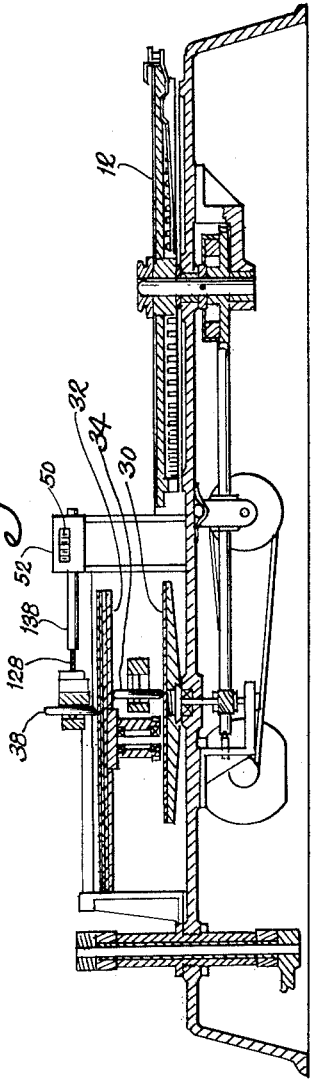
FIG. 2 is a sectional elevational view of an integrator machine.

Before entering into a detailed description of the counter mechanism embodying the features of this invention, a brief description will be made of the integrator mechanism and the operation thereof whereby the graphic pressure lines on the chart are transmitted to readable values on the counter for direct use in calculating the volume of gas flow through the line. Referring now to FIGS. 1 and 2 of the drawings, illustration is made of an integrator formed of a hollow base 10 having the chart reading portion to the right side and the translation portion to the left.

The chart reading portion comprises a chart plate 12 which is mounted for rotational movement by a motor or the like. A pair of operating levers 14 and 16, referred to as the differential pressure operating lever 14 and the static pressure operating lever 16, are adapted to be manually operated to manipulate a differential pressure arm 18 and a static pressure arm 20 over the face of the rotating chart 22 to move the arms across the face of the chart to follow the differential pressure lines 24 and the static pressure lines 26 which have been made on the chart in the field by the recording mechanism.

Translation from the chart to the counter is effected by the elements best shown in FIG. 2 of the drawings including a time plate 30 which is rotated in some ratio with the chart plate 12. Usually the time plate will make 156 revolutions per revolution of the chart plate. Rotational movement of the time plate 30 is transmitted to rotational movement of a differential plate 32 by an idler wheel 34 that is offset from the center of the time plate by an amount bearing some ratio with the static pressure pen arm 20 operating through static cams 36.

Thus the idler wheel will vary in speed of rotation depending upon the position of the static pressure arm on the chart 22. A differential wheel 38 which rides on the surface of the differential plate 32 is offset from the axis of the plate by an amount which bears a ratio with the position of the differential pressure arm 18 on the chart 22 as translated through differential pressure cams 40 and the connecting differential yoke 42 by which the differential wheel is carried radially across the face of the differential plate. Thus the rate of rotation of the differential wheel 38 depends on the rate of rotation of the idler wheel 34 and the offset of the differential wheel 38 from the axis of the differential plate. The number of revolutions of the differential wheel is carried to the counter mechanism hereinafter to be described.

As described in the aforementioned patents which are representative of constructions and operations heretofore employed, the counter mechanism continues to total the revolutions of the differential wheel such that it becomes necessary for the operator carefully to record the readings of the counter before and after each chart integration and to subtract the former values from the latter to arrive at the reading for the flow for the particular chart. Such multiple readings and calculations operate to complicate the integration and lead to errors in arriving at a true flow value. In this regard, it is an important concept of this invention to enhance the removal of data from the machine whereby the indicated value from each chart can be read directly from the counter without the necessity to record values at the start or to effect subtractions of readings one from another during the course of the operation of the machine. It is a related and further important concept to provide a counter mechanism from which the totalled integration of a number of charts can be read directly from the machine without interfering with reading the integrated value for each of the charts thereby to simplify the operation of the machine and to increase the utility thereof as a data recording and calculating machine for gaseous flow.

Referring now to the aforementioned patents for the construction and operation of the counter translation mechanism of the types heretofore employed, it will be seen that the counter mechanism is joined as a rigid and unitary assembly with the differential wheel for displacement therewith by the differential roller supporting yoke over the differential plate. Assembly to mount the counter mechanism for movement with the differential roller introduces a number of objectionable features including instability of the counter mechanism thereby to impose frequent errors and excessive maintenance cost for adjustment or repair. It also imposes excessive loading of the differential roller to introduce possible further errors from the standpoint of wear or interferences with the freedom of movement of the differential roller crosswise of the differential plate or vertically toward and away from the differential plate at the start and at the end respectively of the integrating operation.

Thus a further concept of this invention resides in an assembly of the type described wherein the counter mechanism is mounted for support independently of the differential roller or its supporting yoke whereby the counter mechanism can be supported in a stable fixed position while maintaining an operative connection with the differential roller for direct and accurate translation of rotational movement from the differential roller to the counter mechanism. The described concept for separate support and independent movement can be adapted for use with counter systems of the type heretofore employed as well as with counter systems embodying the previously described features of this invention for direct and total reading of the integrated flow charts.

The counter mechanism, illustrated in FIGS. 3 to 8, includes a reset counter 50 and a continuous counter 52 mounted in spaced apart relation on shafts 54 and 56 supported by the vertically disposed side plates 58 and 60. The side plates are fixed by bolt members to a base plate 63 which in turn is secured to a solenoid housing 64. The latter, including the base plate, is supported on the machine frame 66 in a manner to permit adjustment of the base plate vertically as well as endwise properly to align the counter mechanism with the differential wheel. For this purpose, the assembly is provided with a vertically disposed supporting post 68 having lengthwise slots (not shown) in the bottom wall 70 through which bolts 72 extend for attachment to the machine base and it is provided with vertically disposed slots (not shown) in the front wall 74 through which bolts 76 extend for attachment to the solenoid housing 64 or base plate support. Thus the base plate can be adjusted forwardly and back or up and down for proper alignment and in which position it can be secured by the bolt members described for a fixed support.

For the most part, the counters 50 and 52 of the counter mechanism are of conventional construction including a plurality of counter wheels 80 mounted in axially spaced apart relation for free rotational movement on the shafts 54 and 56 and subdivided peripherally into ten equally spaced segments numbered from zero to 9. Each of the shafts 54 and 56 are provided with a driving gear 82 keyed to the shaft for rotational movement therewith. The driving gear is positioned to engage a pinion gear 84 mounted for free rotational movement on a tens transfer shaft 86 in spaced parallel relationship with the wheel shaft 54 or 56. The pinion gear 84 engages the gear teeth 88 of the first counter wheel 90 to transfer rotational movement of the driving gear 82 to corresponding rotational movement of the counter wheel 90. Adjacent counter wheels are interconnected by tens transfer gears 92 mounted for free rotational movement on the tens transfer shaft 86 with the teeth of the tens transfer gears 92 in meshing relationship with the teeth of the gear of the next higher counter wheel while the next lower counter wheel associated therewith is provided with a detent 94 adapted to engage the tens transfer gear for displacement thereof by one increment when the latter wheel has made one complete revolution. Thus, when the lower wheel has made one complete revolution, the next higher wheel is displaced one increment in a tens transfer.

The reset counter 50 is of a different construction than the continuous counter 52 in that the wheels of the reset counter are each provided with a cam plate 96 rigidly secured to the side wall of the wheel with the maximum offset from the axis in radial alignment with the space between the 4 and 5 positions on the periphery of the wheel and the minimum offset from the axis in radial alignment with the zero position of the wheel where the cam is also flattened so that, when the wheels are released by the tens transfer gears to enable free rotational movement on the shaft 54, and when the cam surfaces are resiliently engaged by the spring arm 98, the spring arms operate to rotate the cams about the axis until the spring arms come to rest on the portion of minimum offset or zero position on the wheels thereby to return each of the wheels to zero position.

Each wheel is provided with its own cam plate 96 and each cam plate is provided with its own spring arm in radial alignment therewith mounted for rocking movement between normal and cam engaging position. For this purpose, the spring arms 98 are mounted in laterally spaced apart relation to extend from a plate 100 mounted on shaft 102 supported for free rotational movement between the side plates 58 and 60. Links 104 and 106 interconnect the shaft 102 with a solenoid 108 mounted within the solenoid houshing 64 for rocking movement of the spring arms to camming position responsive to activation of the solenoid and for return of the spring arms to normal position responsive to de-energization of the solenoid.

In order to free the counter wheels for free rotational movement to reset the wheels to zero position, it is also desirable simultaneously to displace the transfer gears from engagement with the wheels. For this purpose, the tens transfer shaft 86 is supported at its ends in guide plates 110 having elongate slots 112 through which the shaft extends for displacement of the shaft between a normal position in which the gears engage the wheel gears and displaced position in which the gears are free of the wheels. The tens transfer shaft is constantly urged towards normal position and is displaced from normal position to displaced position responsive to activation of the solenoid to effect rearward displacement of the link 106 having a cam groove 114 in which the shaft 86 rests in normal position and whereby the shaft is cammed to displaced position upon activation of the solenoid thereby to cause disengagement between the tens transfer gears and the wheel gears while, at the same time, the linking arms cause rocking movement of the spring arm to camming position for return of each of the wheels to 0 position.

Figure 3:
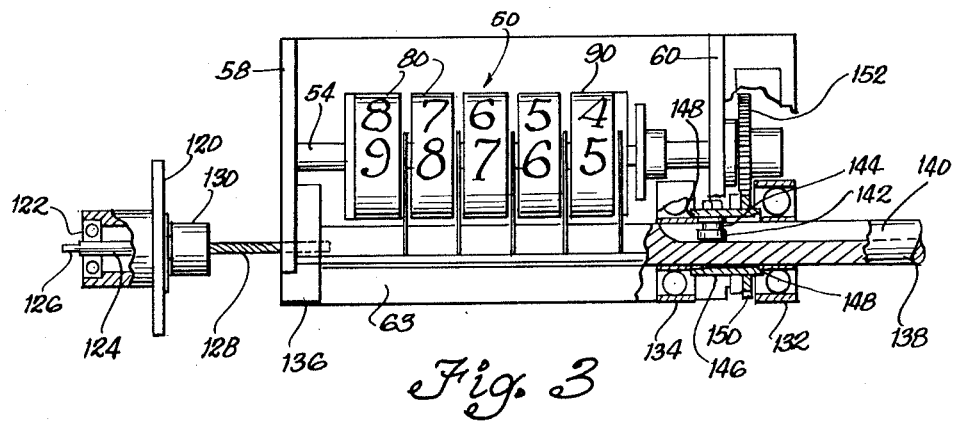
FIG. 3 is a schematic elevational view partially in section of the counter mechanism embodying the features of this invention.
Figure 4:
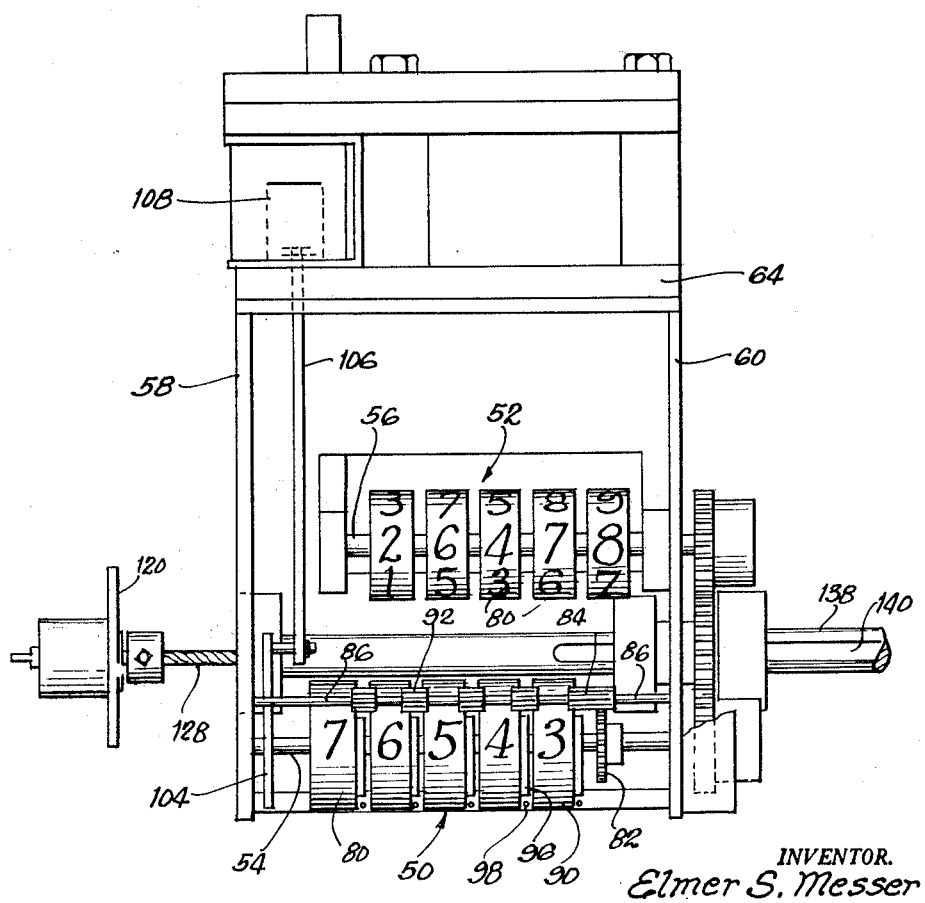
FIG. 4 is a schematic top plan view, with parts broken away, of the counter mechanism shown in FIG. 3.

Having briefly described the continuous counter and the reset counter and the operation thereof, description will now be made of the translation means whereby rotational movement of the differential wheel is transmitted concurrently and accurately to the described counters. Referring now to FIG. 3, a housing 120 is secured in conventional manner to a differential yoke of the type described in the aforementioned issue patents for movement of the housing with the differential yoke, as influenced by the differential pressure arm reading the differential pressure lines of the chart. The housing is provided with spaced bearings 122 for support of a jack shaft 124 in a manner to permit free rotational movement. The outer end of the rotatably supported jack shaft is formed with a flattened key 126 adapted to be received in fitting relationship within a corresponding slot in the center of the differential wheel 38 whereby the wheel is mounted on the end of the shaft for concurrent free rotational movement.

The jack shaft 124 and an axially aligned flexible cable 128 are secured in endwise alignment for transmitting rotational movement of the jack shaft to the flexible cable. Such attachment can be effected through a housing 130 in which the inner end portion of the jack shaft is secured, as by a setscrew, while the forward end portion of the flexible cable is similarly secured thereto.

Spaced bearings 132, 134 and 136 support a rigid translating shaft 138 for free rotational movement and for free axial displacement relative to the supporting side plates 58 and 60 of the counter mechanism with the translation shaft 138 aligned endwise with the flexible cable shaft 128 for operative connection therewith whereby the translation shaft rotates with the flexible shaft and is able freely to shift axially therewith. Thus rotational movement is transmitted from the differential wheel 38 to the translation shaft 138 while the flexible cable 128 permits movement of the differential wheel and supporting yoke relative to the translation shaft into and out of engagement with the differential plate.

The elongate translation shaft 138 is formed with an axial slot 140 in one surface dimensioned to have a length greater than the amount of axial displacement calculated to take place between the translation shaft and the counter mechanism responsive to displacement of the differential wheel by its supporting differential yoke.

A bearing disc 142, mounted for rotational movement on the end of a stud 144 depending from a transfer housing 146, is received in fitting relationship within the elongate slot 140 to permit endwise displacement of the shaft 138 relative to the bearing disc and its supporting housing while transferring rotational movement of the shaft to the housing. The housing may be a cylindrical member or a rectangular member or other member of polygonal shape supported between bearings 132 and 134 for free rotational movement in a fixed position. For this purpose, the spaced bearings 132 and 134 can be double shielded bearings with the inner shields removed to make available a recess 148 on the inner race of each bearing for receiving the edges of the plates forming the transfer housing in a concentric position whereby rotational movement of the shaft is transmitted to the housing with the development of minimum inertia forces.

The transfer housing 146 has a transfer gear 150 which meshes with an idler gear 152 mounted for free rotational movement on a yoke 154 rigid with a side plate 60 of the counter mechanism. A continuous counter gear 156, keyed to the end of the continuous counter shaft 56, meshes with the gear teeth of the idler gear 152 for the transmission of rotational movement from the driving gear 150 through the idler gear 152 to the continuous counter gear 156. A similar gear 158 of the same dimension and the same number of gear teeth as in the continuous counter gear 156 is keyed onto the end of the reset counter shaft 54 and it also meshes with the gear teeth of the idler gear 152 for simultaneous translation of rotational movement from the driving gear 150 through the idler 152 to the gear 158. The simultaneous and exact rotational movements of the shafts 54 and 56 are transmitted through the fixed gear 82 through the pinions 84 to the counter wheels, as previously described.

In operation, the differential yoke 42 lowers the differential wheel 38 into engagement with the surface of the differential plate 32. As the plate is rotated in response to rotational movement of the time plate 30 and the intervening idler wheel 34, and as the yoke is displaced in and out in response to movement of the pressure differential arm on the chart, the rotational movement of the differential wheel is transmitted through the jack shaft 124 and flexible cable 128 to the slotted shaft 138. Rotational movement of the slotted shaft is in turn transmitted to the transfer housing 146 and from the transfer housing to the transfer gear 150 and through the idler gear 152 and the meshing gears 156 and 158 to the continuous counter shaft 56 and the reset counter shaft 54. The number of rotations are recorded on the counter wheels, as described.

When the chart has been integrated, the numerical reading on the continuous counter wheels will correspond to the total of all the charts since the integrated value of the chart will merely be added to the previous total. The integrated value of the chart can be read directly from the numerical values of the wheels on the reset counter.

When the chart has been integrated and before beginning integration of the next chart, the solenoid 108 is activated whereby the link 106 is retracted to cam the tens transfer shaft 86 of the reset counter from normal to displace position to free the wheels for rotational movement while the link 106 also operates through the connecting link 104 to rock the shaft 102 to operated position whereby the spring arms 98 are brought into resilient engagement with the periphery of the wheel cams 96 to cause displacement of the wheels to zero position. Upon return of the wheels to zero position, the solenoid 108 is de-energized to retract the spring arms from engagement with the cams and to enable the tens transfer shaft to return to normal position with the tens transfer gears in operative engagement with the wheels for tens transfer.

Two problems have been encountered in the operation of the described reset counter mechanism. On occasion, because of the continued movement of the output shaft 54 of the reset counter, the number 1 counter wheel 90 may stop at a position between two numbers. When this occurs, a gear tooth of the wheel might be in direct alignment with a tooth on the transfer gear 84 when the wheel is returned to zero whereby the tens transfer shaft will be obstructed from return to normal position. A further problem which is sometimes encountered resides in a situation wherein a counter wheel of the reset counter is between 4 and 5 such that the spring arm engages the cam at a point which is dead center with the axis of rotation so that no camming action for return to zero can be effected.

To overcome these problems, an indexing means is provided comprising an indexing gear 160 keyed to the shaft 54 wherein the gear is in the form of a star gear having ten equally spaced apart projections 162 corresponding to the positions of the numbers on the wheels. A rocker arm 164 is keyed at one end onto an extension of the rocker shaft 102 for rocking movement of the arm 164 responsive to turning movement of the shaft for displacement of the spring arm between normal and operated positions. An indexing arm 166 is also mounted on the shaft 102 for free rocking movement. The rocker arm 164 and the indexing arm 166 are resiliently interconnected by a spring member 168 whereby the indexing arm 166 is urged to rock about the shaft 102 is a pivot in the direction with the rocker arm 164. A bearing disc 169 is rotatably supported on an outer end portion of the indexing arm in a position to engage the starred indexing gear 160 when the indexing arm is rocked clockwise to indexing position.

The position of the cam surface 114 on the link 106 is arranged with reference to the position of the rocker arm 164 and the indexing arm 166 such that the indexing bearing 168 will come into engagement with the starred gear 160 before the tens transfer shaft 86 is displaced to disengage the tens transfer gears from the counter wheels. As a result, the index bearing 168 comes into engagement with the starred gear 160 before the tens transfer gears are disengaged from the counter wheels and then the indexing bearing 168 will remain in engagement with the starred indexing gear 160 until after the tens transfer gears are re-engaged with the geared counter wheels.

The position of the indexing starred gear 160 on the reset counter shaft 54 is such that if a counter wheel lies between 4 and 5, a point on the indexing gear 160 will be in the direct path of the indexing bearing 168 whereby the latter will cause the wheel to rotate from a dead center position. By arranging the contour of the cam 114 such that the rotation of the rocker arm 64 is completed before the tens transfer gears are disengaged from the geared counter wheels, then any rotation of the indexing gear 160 will cause the entire counter system to rotate a sufficient number of degrees to remove the cam from dead center position. By such construction of the cam contour 114, the tens transfer gears will become re-engaged with the driving gear 82 and the geared counter wheels before the indexing bearing 168 is removed from engagement with the indexing gear 160 with the result that the gears on the tens transfer shaft 86 will always be in proper alignment to receive the gear 82 and the gears of the counter wheels thereby to avoid improper meshing of the gear system.

As previously pointed out, the improvement to permit the counter to be fixed in position on the machine with independent movement of the differential wheel and in the means for transmission of rotary motion of the differential wheel to the stationary counters without interferences from various developed forces, is applicable to counters presently in use as well as to the reset counter combination herein described.

It will be apparent from the foregoing description that I have provided an integrator embodying a number of improvements whereby the integration from each chart can be read directly from the counter and whereby a running total of a number of charts can be maintained for direct reading as a check or as a totalizing means in the calculating process.

It will be understood that the integrator described has been set forth by way of illustration and not by way of limitation since the concepts of the invention are applicable to integrators of other construction which use a differential wheel shiftable over a plate for varying the rate and direction of rotation depending upon the direction and distance of offset of the wheel from the axis of the plate. Thus the concepts described are applicable to other counter systems wherein individual and running totals of charts or wheel readings are required and where the number of revolutions of a differential wheel, otherwise activated, is desired.

It will be further understood that changes may be made in the details of construction, arrangement and operation, without departing from the spirit of the invention, especially as defined in the following claims.

I claim:

1. In an integrating device having a rotatable chart plate, a rotatable time plate, a rotatable differential plate, a shiftable idler wheel between the time plate and differential plate to rotate the differential plate at various speeds with respect to the time plate and a differential wheel shiftable into and out of engagement with the differential plate and shiftable substantially radially relative thereto for rotation of the differential wheel in amounts depending upon the rate of rotation of the differential plate and the position of the differential wheel on the plate, means for counting the revolutions of the differential wheel comprising a stationary reset counter including a frame, a main drive shaft mounted for rotational movement on the frame, an operative connection between said main drive shaft and the differential wheel for transmission of rotational movement of said wheel to said main drive shaft, a rotatable reset counter shaft, a plurality of peripherally numbered wheels rotatably mounted on said reset counter shaft in spaced side by side relation, a tens transfer shaft in spaced parallel relation with the reset counter shaft and shiftable between a tens transfer position and retracted position, tens transfer gears rotatably mounted on said tens transfer shaft in operative engagement with adjacent numbered wheels when in tens transfer position for advancement of the next wheel one numbered increment responsive to a predetermined rotational movement of the other wheel, an operative connection between the main drive shaft and the first of the numbered wheels for rotating said first wheel responsive to rotational movement of the main drive shaft, said last mentioned operative connection including a gear means keyed to said drive shaft for rotation therewith, said gear means being connected with said first wheel, and wherein said drive shaft includes a flexible section to permit radial movement of the differential wheel relative to the drive shaft, said drive shaft being slideable relative to said gear means to compensate for shifting movement of said differential wheel relative to said stationary counter, and means for returning the numbered wheels to zero position when the chart has been integrated and before the next chart integration is started, including a cam plate rigid with each wheel and having a cam edge which increases in offset in both directions from zero position, cam arms shiftable between normal and cam engaging positions, means for actuating said cam arms from normal to cam engaging position and back, and means for shifting the tens transfer shaft to retracted position when the cam arms are shifted to cam engaging position whereby the wheels are free for rotational movement on the reset counter shaft for return to zero position responsive to camming engagement of the cam arms on the cam plates.

2. In an integrator having a rotatable differential wheel, means for indicating directly the number of revolutions of the wheel per integration comprising a stationary reset counter including a frame, a main drive shaft mounted for rotational movement on said frame, an operative connection between said main drive shaft and the differential wheel for the transmission of rotational movement from said wheel to said main drive shaft, a rotatable reset counter shaft, a plurality of peripherally numbered wheels rotatably mounted on said reset counter shaft in side by side relation, a tens transfer shaft in spaced parallel relation with said reset counter shaft and shiftable between a tens transfer position and retracted position, tens transfer gears rotatably mounted on said tens transfer shaft in operative engagement with adjacent numbered wheels for incremental advancement of the next wheel responsive to a predetermined amount of rotational movement of the other wheel, an operative connection between the main drive shaft and the first of the numbered wheels for rotating said first wheel responsive to rotational movement of the main drive shaft, said last mentioned operative connection including a gear means keyed to said drive shaft for rotation therewith, said gear means being connected with said first wheel, and wherein said drive shaft includes a flexible section to permit radial movement of the differential wheel relative to the drive shaft, said drive shaft being slideable relative to said gear means to compensate for shifting movement of said differential wheel relative to said stationary counter, and means for returning the numbered wheels to zero position when the integration has been completed and before the next integration is started comprising a cam plate rigid with each numbered wheel having a cam edge which increases in offset in both directions from a zeroizing position, cam arms shiftable between normal position and cam engaging position, means for actuating said cam arms from normal to cam engaging position and back, and means for shifting the tens transfer shaft to retracted position to disengage the tens transfer gears from the numbered wheels when the camming arms are shifted to cam engaging position whereby the wheels are free to turn on the reset counter shaft for return to zero position responsive to camming engagement of the cam arms on the cam plates.

3. A device as claimed in claim 2 in which the peripherally numbered wheels are formed with gear teeth in position to be engaged by the tens transfer gears for actuation of the numbered wheels and which includes an indexing means for shifting the counter wheels from dead center position with respect to the cam arms before displacement of the cam arms from normal to camming position.

4. A device as claimed in claim 2 which includes means for indicating directly the total of the number of revolutions for a plurality of integrations comprising a cumulative counter shaft, peripherally numbered wheels rotatably mounted on said cumulative counter shaft, a tens transfer shaft mounted in spaced parallel relationship with the cumulative counter shaft, tens transfer means rotatably mounted on said tens transfer shaft interconnecting adjacent wheels for tens transfer and an operative connection between said main drive shaft and the first of the wheels on said cumulative counter shaft for transmission of rotational movement from said main drive shaft to said first numbered wheels.

5. In a machine for counting the number of revolutions of a differential wheel from which the number of revolutions per calculation can be read directly and from which the number of revolutions per calculation are accumulated for direct reading of the total comprising a reset counter including a frame, a main drive shaft mounted for rotational movement on said frame, an operative connection between said main drive shaft and the differential wheel for the transmission of rotational movement from said wheel to said main drive shaft, a rotatable reset counter shaft, a plurality of peripherally numbered wheels rotatably mounted on said reset counter shaft in side by side relation, a tens transfer shaft in spaced parallel relation with said reset counter shaft and shiftable between a tens transfer position and retracted position, tens transfer gears rotatably mounted on said tens transfer shaft in operative engagement with adjacent numbered wheels for incremental advancement of a predetermined amount of rotational movement of the other wheel, an operative connection between the main drive shaft and the first of the numbered wheels for rotating said first wheel responsive to rotational movement of the main drive shaft, said last mentioned operative connection including a gear means keyed to said drive shaft for rotation therewith, said gear means being connected with said first wheel, and wherein said drive shaft includes a flexible section to permit radial movement of the differential wheel relative to the drive shaft, said drive shaft being slideable relative to said gear means to compensate for shifting movement of said differential wheel relative to said stationary counter, and means for returning the numbered wheels to zero position when the integration has been completed and before the next integration is started comprising a cam plate rigid with each numbered wheel having a cam edge which increases in offset in both directions from a zeroizing position, said arms shiftable between normal position and cam engaging position, means for actuating said cam arms from normal to cam engaging position and back, means for shifting the tens transfer shaft to retracted position to disengage the tens transfer gears from the numbered wheels when the camming arms are shifted to cam engaging position whereby the wheels are free to turn on the reset counter shaft for return to zero position responsive to camming engagement of the cam arms on the cam plates, means for indicating directly the total of the number of revolutions for a plurality of integrations comprising a cumulative counter shaft, peripherally numbered wheels rotatably mounted on said cumulative counter shaft, a tens transfer shaft mounted in spaced parallel relationship with the cumulative counter shaft, tens transfer means rotatably mounted on said tens transfer shaft interconnecting adjacent wheels for tens transfer, and an operative connection between said main drive shaft and the first of the wheels on said cumulative counter shaft for transmission of rotational movement from said main drive shaft to said first numbered wheels.

6. In a machine for counting the number of revolutions of a wheel per calculation and in which the number of revolutions can be read directly, comprising a reset counter including a frame, a main drive shaft mounted for rotational movement on the frame, an operative connection between said main drive shaft and the differential wheel for transmission of rotational movement of said wheel to said main drive shaft, a rotatable reset counter shaft, a plurality of peripherally numbered wheels rotatably mounted on said reset counter shaft in spaced side by side relation, a tens transfer shaft in spaced parallel relation with the reset counter shaft and shiftable between a tens transfer position and retracted position, tens transfer gears rotatably mounted on said tens transfer shaft in operative engagement with adjacent numbered wheels when in tens transfer position for advancement of the next wheel one numbered increment responsive to a predetermined rotational movement of the other wheel, an operative connection between the main drive shaft and the first of the numbered wheels for rotating said first wheel responsive to rotational movement of the main drive shaft, and means for returning the numbered wheels to zero position when the chart has been integrated and before the next chart integration is started, including a cam plate rigid with each wheel and having a cam edge which increases in offset in both directions from zero position, cam arms shiftable between normal and cam engaging positions, means for actuating said cam arms from normal to cam engaging position and back, and means for shifting the tens transfer shaft to retracted position when the cam arms are shifted to cam engaging position whereby the wheels are free for rotational movement on the reset counter shaft for return to zero position responsive to camming engagement of the cam arms on the cam plates, said numbered wheels being formed with gear teeth in position to be engaged by the tens transfer gears for actuation of the numbered wheels, said device including an indexing means for aligning the gears of the reset counter wheels with the tens transfer gears for meshing the gears upon return of the tens transfer gears to tens transfer position comprising a star wheel keyed onto the reset counter shaft, a bearing plate shiftable into and out of engagement with the star wheel, and means for displacement of said bearing plate into engagement with the star wheel from a time prior to displacement of the tens transfer shaft from tens transfer to retracted position until return of the tens transfer shaft from retracted to tens transfer position whereby the gears of the counter wheels and the tens transfer gears are retained in proper alignment.

7. In an integrator having a differential wheel mounted for variable rotational movements and for axial movement, stationary means for counting the number of revolutions of the differential wheel comprising a stationary counter having a fixed frame, a drive shaft in axial alignment with the differential wheel and mounted on said frame for concurrent free rotational movement and axial movement with said differential wheel, an operative connection between said drive shaft and the differential wheel for rotational movement of the drive shaft with said wheel and for axial displacement of the drive shaft with said wheel, counter wheels stationarily mounted on said frame for rotational movement, and an operative connection between said main drive shaft and the counter wheels for transmission of rotational movement of the main drive shaft to the counter wheels comprising an elongated axial slot in the periphery of the drive shaft dimensioned to have a length at least as great as the amount of displacement of the differential wheel, gear means keyed into the slot for rotational movement with the drive shaft without axial displacement thereof, an operative connection between said stationarily positioned rotatable gear means and the counter wheels for the transmission of rotational movement of said gear means to said counter wheels, the operative connection between the drive shaft and the differential wheel including a flexible shaft interconnecting the differential wheel and the drive shaft to permit radial movement of the differential wheel relative to the drive shaft while transmitting rotational and axial movement from the differential wheel to the drive shaft.

8. In a device for integrating for fluid flow from differential pressure lines and static pressure lines inscribed upon charts responsive to pressure conditions existing during fluid flow through an orifice place, a rotatable chart plate on which the charts to be integrated are mounted, a pressure differential arm and a static differential arm mounted for movement between said lines on said chart during rotational movement, a rotatable time plate rotated at a constant speed ratio with said chart plate, a rotatable differential plate, an idler wheel shiftable radially between said time plate and differential plate responsive to the position of one of said pen arms for transmitting rotatable movement from the time plate to the differential plate at various speeds depending upon the radial position of said idler wheel, and a differential wheel shiftable into and out of engagement with the differential plate and shiftable radially relative thereto responsive to the position of another of said pressure reading arms for rotational movement of said differential wheel in an amount depending upon the rate of rotation of the differential plate and the radial position of the differential wheel on the plate, means for counting the revolutions of the differential wheel comprising a stationary reset counter including a frame, a main drive shaft mounted for rotational movement on the frame, an operative connection between said main drive shaft and the differential wheel for transmission of rotational movement of said wheel to said main drive shaft, a rotatable reset counter shaft, a plurality of peripherally numbered wheels rotatably mounted on said reset counter shaft in spaced side by side relation, a tens transfer shaft in spaced parallel relation with the reset counter shaft and shiftable between a tens transfer position and retracted position, tens transfer gears rotatably mounted on said tens transfer shaft in operative engagement with adjacent numbered wheels when in tens transfer position for advancement of the next wheel one numbered increment responsive to a predetermined rotational movement of the other wheel, an operative connection between the main drive shaft and the first of the numbered wheels for rotating said first wheel responsive to rotational movement of the main drive shaft, and means for returning the numbered wheels to zero position when the chart has been integrated and before the next chart integration is started, including a cam plate rigid with each wheel and having a cam edge which increases in offset in both directions from zero position, cam arms shiftable between normal and cam engaging positions, means for actuating said cam arms from normal to cam engaging position and back, and means for shifting the tens transfer shaft to retracted position when the cam arms are shifted to cam engaging position whereby the wheels are free for rotational movement on the reset counter shaft for return to zero position responsive to camming engagement of the cam arms on the cam plates, and wherein the counter wheels on the reset counter shaft have gear teeth adapted to be engaged by the tens transfer gears for actuation thereof and an indexing means for aligning the gears of the reset counter wheels with the tens transfer gears to enable meshing the gears upon return of the tens transfer gears to tens transfer position comprising a star wheel keyed to the reset counter shaft, a bearing plate shiftable into and out of engagement with the star wheel and means for displacement of said bearing means into engagement with the starred wheel from a time prior to displacement of the tens transfer shaft from tens transfer to retracted position and until return of the tens transfer shaft from retracted to tens transfer position whereby the gears of the wheels and the tens transfer gears are retained in proper alignment.

9. In an integrator having a rotatable differential wheel, means for indicating directly the number of revolutions of the wheel per integration comprising a stationary reset counter including a frame, a main drive shaft mounted for rotational movement on said frame, an operative connection between said main drive shaft and the differential wheel for the transmission of rotational movement from said wheel to said main drive shaft, a rotatable reset counter shaft, a plurality of peripherally numbered wheels rotatably mounted on said reset counter shaft in side by side relation, a tens transfer shaft in spaced parallel relation with said reset counter shaft and shiftable between a tens transfer position and retracted position, tens transfer gears rotatably mounted on said tens transfer shaft in operative engagement with adjacent numbered wheels for incremental advancement of the next wheel responsive to a predetermined amount of rotational movement of the other wheel, an operative connection between the main drive shaft and the first of the numbered wheels for rotating said first wheel responsive to rotational movement of the main drive shaft, and means for returning the numbered wheels to zero position when the integration has been completed and before the next integration is started comprising a cam plate rigid with each numbered wheel having a cam edge which increases in offset in both directions from a zeroizing position, cam arms shiftable between normal position and cam engaging position, means for actuating said cam arms from normal to cam engaging position and back, and means for shifting the tens transfer shaft to retracted position to disengage the tens transfer gears from the numbered wheels when the camming arms are shifted to cam engaging position whereby the wheels are free to turn on the reset counter shaft for return to zero position responsive to camming engagement of the cam arms on the cam plates, and wherein the peripherally numbered wheels are formed with gear teeth in position to be engaged by the tens transfer gears for actuation of the numbered wheels and which includes an indexing means for shifting the counter wheels from dead center position with respect to the cam arms before displacement of the cam arms from normal to camming position, said indexing means comprising a star wheel keyed onto the reset counter shaft for rotational movement therewith, a guide bearing shiftable radially in the direction toward and away from the star wheel, a projection on the star wheel lying in the path of the bearing when a numbered wheel is in dead center position, and means for shifting the bearing toward the star wheel before displacement of the tens transfer shaft to retracted position whereby the numbered wheel is rotated from dead center position before being engaged by the cam arms.

10. In an integrator having a rotatable differential wheel, means for indicating directly the number of revolutions of the wheel per integration comprising a stationary reset counter including a frame, a main drive shaft mounted for rotational movement on said frame, an operative connection between said main drive shaft and the differential wheel for the transmission of rotational movement from said wheel to said main drive shaft, a rotatable reset counter shaft, a plurality of peripherally numbered wheels rotatably mounted on said reset counter shaft in side by side relation, a tens transfer shaft in spaced parallel relation with said reset counter shaft and shiftable between a tens transfer position and retracted position, tens transfer gears rotatably mounted on said tens transfer shaft in operative engagement with adjacent numbered wheels for incremental advancement of the next wheel responsive to a predetermined amount of rotational movement of the other wheel, an operative connection between the main drive shaft and the first of the numbered wheels for rotating said first wheel responsive to rotational movement of the main drive shaft, and means for returning the numbered wheels to zero position when the integration has been completed and before the next integration is started comprising a cam plate rigid with each numbered wheel having a cam edge which increases in offset in both directions from a zeroizing position, cam arms shiftable between normal position and cam engaging position, means for actuating said cam arms from normal to cam engaging position and back, and means for shifting the tens transfer shaft to retracted position to disengage the tens transfer gears from the numbered wheels when the camming arms are shifted to cam engaging position whereby the wheels are free to turn on the reset counter shaft for return to zero position responsive to camming engagement of the cam arms on the cam plates, and wherein the operative connection between the drive shaft and the differential wheel includes a flexible shaft interconnecting the differential wheel and the drive shaft to permit radial movement of the differential wheel relative to the drive shaft while transmitting rotational and axial movements from the differential wheel to the drive shaft.

References Cited in the file of this patent
UNITED STATES PATENTS

| | | |
|---|---|---|
| 1,429,983 | Turner | Sept. 26, 1922 |
| 2,219,636 | Schwartz | Oct. 29, 1940 |
| 2,263,371 | Tolnai | Nov. 18, 1941 |
| 2,359,661 | Moody | Oct. 3, 1944 |
| 2,769,596 | Loosli | Nov. 6, 1956 |
| 2,773,642 | McGay | Dec. 11, 1956 |
| 2,992,775 | Luscher | July 18, 1961 |